Patented Nov. 25, 1924.

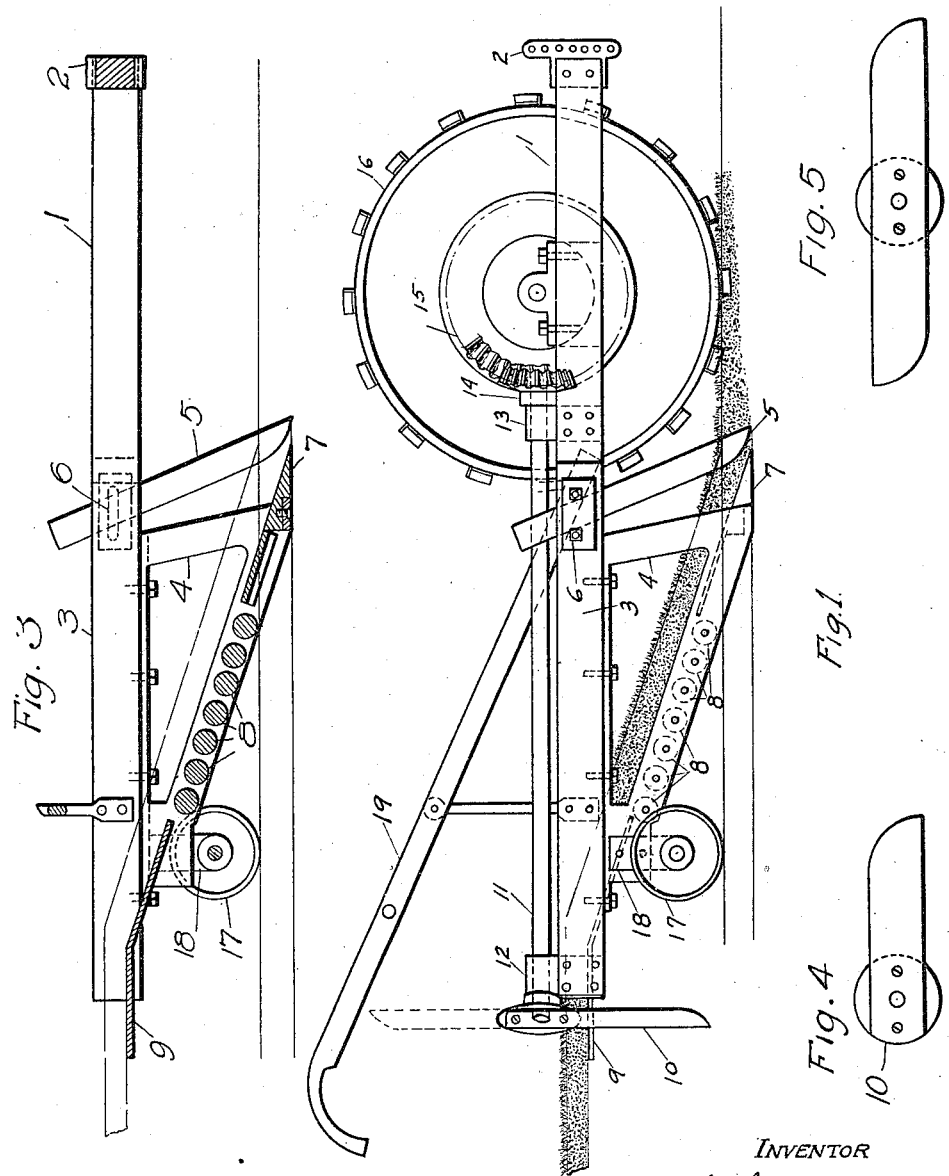

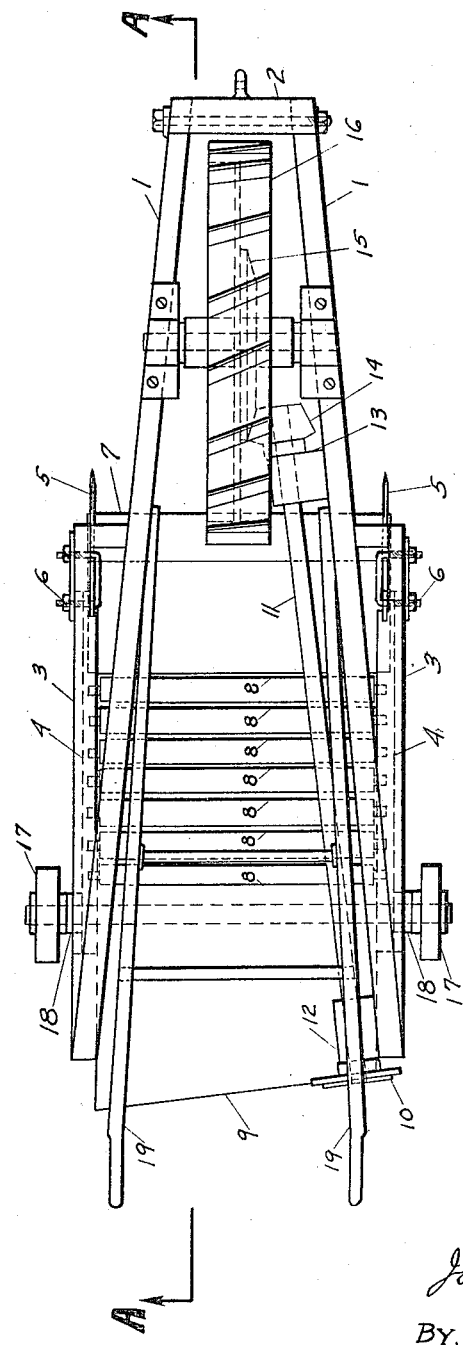

1,516,561

UNITED STATES PATENT OFFICE.

JOHN BEST, OF DETROIT, MICHIGAN, ASSIGNOR OF ONE-HALF TO JAMES J. SHERMAN, OF DETROIT, MICHIGAN.

SOD-CUTTING MACHINE.

Application filed July 12, 1922. Serial No. 574,461.

*To all whom it may concern:*

Be it known that I, JOHN BEST, a citizen of the United States, residing in the city of Detroit, county of Wayne, State of Michigan, have invented certain new and useful Improvements in a Sod-Cutting Machine, and declare the following to be a full, clear, and exact description of the same, such as will enable others skilled in the art to which it pertains to make and use the same, reference being had to the accompanying drawings, which form a part of this specification.

The object of my invention is to provide a machine whereby thin layers of sod may be cut free from the soil for the purpose of re-sodding lawns and similar purposes.

Another object is to provide a sod cutter that can be operated by power, either by a horse or motor power, instead of the hand sod cutter as is used at the present time.

A further object is to provide a sod cutting machine that can regulate the thickness of the sod to be cut as may be desired for any special purpose, and may also regulate the size of the blocks of sod as they come from the machine.

A still further object is to provide a sod cutter that will operate continuously and can be set and regulated to cut the sod uniform in size and thickness.

Another object is to provide a machine that is simple in construction, easily and efficiently operated and can be manufactured at a very low cost.

These several objects are secured in their preferred form by the construction and arrangement of parts as are more fully hereafter set forth.

Similar parts on all drawings are marked by similar numerals.

Fig. 1, is a side view of the sod cutting machine showing the general construction and arrangement of the working parts and the means of applying the machine to the sod.

Fig. 2, is a top view of the sod cutter showing the relative position of the operating mechanism and the means for separating the sod into small blocks.

Fig. 3 is a sectional view of the machine taken on line —AA— of Fig. 2, showing the means for shearing the sod from the supporting soil and elevating same to the cutting knives.

Fig. 4, is a view of the cutting knife where a single blade is used for cutting long blocks of sod.

Fig. 5 is also a side view of a special cutting knife, with double blades, for the purpose of cutting short blocks of sod.

I will now describe more fully the detailed construction of the machine, referring to the drawings and the marks thereon.

The general arrangement of my sod cutting machine is such that the machine may be drawn by any motive power, cutting continuously the thin layer of sod from the supporting soil, in a similar manner as operating a land plow.

The supporting frame —1— may be made of either wood or steel beams, extending the entire length of the machine. Two beams being used and set at an angle with each other in the horizontal plane, for the purpose of rigidity and better supporting the operating parts connected thereto. At the front end of the frame is mounted the large drive wheel —16—, having lugs thereon to prevent the wheel from slipping on the soil, while the rear end of the frame is supported by the adjustable wheels —17—. At the front end of the frame bars —1—, is a connecting casting —2— for holding the bars firmly together and to provide means for attaching the motive power for propelling the sod cutter over the ground. On the outside of each of the frame bars —1— is a short subframe —3—, comprised also of wood or iron beams and attached securely thereto, for the purpose of supporting the side housing castings —4—. At the front end of each of the sub-frames —3—, attached inside thereof, is a steel cutting knife —5—, arranged in a vertical plane and inclined to the front of the machine, with the point extending down beneath the sod for the purpose of cutting the sod in narrow strips. The depth of the point on cutter —5— may be regulated by adjusting in the yoke —6— attached to the sub-frame —3—. The distance between the two cutter knives —5— determines the width of the sod to be cut. Also attached to the subframe —3—, on the under side thereof, are the supporting castings —4— which carry the lifting share blade —7— and the elevator rollers —8—. The blade —7— is made of hardened steel suitable for plowing through the soil, and extending the full length of the machine, the same being attached to the housing castings —4— by means of bolts as shown in Fig. 3. The blade —7— is a V-shaped casting with the sharp edge placed on the front side and so arranged as to shear the sod from the soil as the machine is drawn forward. The cutters —5— are arranged ahead of the lifting share —7— to cut the sod clear before the lifting begins. As the machine passes over the ground, the thin narrow strip of sod is forced back through the throat of the cutter, over the elevator rolls —8—, back to the block cutting table —9—. The rollers —8— are pivoted at each end in the housing castings —4—, extending the full width to allow the strip of sod to pass over, and the loose dirt to fall through between the rollers. At the rear end of the machine is the block cutting knife —10—, comprising a single cutting blade, as shown in detail Fig. 4, and mounted on the shaft —11—. The blade —10— is caused to revolve as the sod cutter is drawn forward, and at intervals as the sod passes over the back of the machine, cuts the sod in blocks of suitable lengths for handling. The shaft —11— is mounted on bearings —12— and —13— on one of the frame bars —1—, and carries on the front end thereof, securely attached thereto, a pinion gear —14—. Gear —14— meshes with a large bevel gear —15— which is fastened to the side of the main drive wheel —16—. As the sod cutter is drawn forward the drive wheel —16— is caused to roll on the ground, thus rotating the pinion gear —14— and the block cutting knife —10—, cutting the thin strip of elevated sod into blocks as the knife passes through. The size of the drive wheel and the speed of the block knife determines the length of the sod block delivered from the machine. Additional blades may be added, as shown in Fig. 5, causing the sod to be cut in shorter blocks. As the strip of sod is continually moving backward through the machine while the cutting knife —10— is revolving, it is essential that the cutting knife be set at an angle with the line of sod to compensate for the movement thereof, and to cut the blocks at right angles at the ends. The angle at which the knife is set depends upon the relative speed of the machine to the velocity of the cutting knife —10—. The rear of the frame —1— is supported by the two wheels —17— mounted upon adjustable supports —18—, attached to the housing castings —14— by means of bolts. By raising or lowering these wheels, the thickness of the sod to be cut can be regulated as desired. Above the frame —1— and attached thereto are the handles —19— for the purpose of guiding and controlling the sod cutter while in operation.

I do not wish to be confined to the exact construction of my machine as heretofore described, but claim any form of sod cutter that is substantially a substitution of parts herein shown.

Having fully described my sod cutter, what I claim as my invention and desire to secure by Letters Patent is:

1. A sod cutter of the character described comprising one or more vertical cutting blades for cutting the sod in narrow strips, a horizontal share for cutting the sod from the soil, a frame and wheels for supporting same, a revolving block knife with multiple blades for cutting the sod into blocks, means for operating same by connections with the drive wheel of the machine, a sod cutting table, angular means for cutting the blocks of sod at right angles, and means for operating the machine.

2. A sod cutter of the character described comprising one or more vertical cutting blades for cutting the sod in narrow strips, a horizontal sod share for cutting the sod loose from the soil, a frame and wheels for supporting all of said cutting blades, a revolving block knife having one or more cutting blades, means for connecting same to the main drive wheel, means for cutting the thin strip of sod at right angles and means for operating the sod cutter.

3. A sod cutter of the character described comprising one or more vertical sod cutting blades, a horizontal sod shearing blade, a frame and wheels for supporting all of said blades, means for adjusting the height of the wheels for regulating the thickness of the sod to be cut, a revolving block cutting knife, a shaft and gears for connecting same to the main drive wheel of the sod cutter, an angular sod cutting table and means for cutting the sod blocks at right angles, and means for operating the sod cutter.

4. A sod cutter substantially as set forth comprising vertical sod knives for cutting the sod into a narrow strip, a horizontal shearing knife for cutting the sod from the soil, a frame and wheels for supporting same, means for adjusting the depth of the vertical sod knives into the soil, a revolving sod cutting knife, means for operating same in connection with the main drive wheel, an angular sod table for cutting the sod with square ends, means for conveying the sod from the horizontal shearing blade to the cutting table and means for operating the sod cutter.

5. A sod cutter substantially as set forth comprising vertical sod cutting knives for cutting the sod in narrow strips, a horizontal share for cutting the sod from the soil, a frame and wheels for supporting same, means for regulating and adjusting same, a revolving cutting knife, means for operating same in connection with one of the supporting wheels of the sod cutter, means for setting the revolving cutting knife at an angle with the axis of the machine, means for regulating said revolving knife to work with the moving line of sod so as to cut it with square ends, an angular sod table for supporting the sod, rollers for conveying the sod from the horizontal share to the cutting table and knife, and means for operating the sod cutter.

In witness whereof I sign these specifications.

JOHN BEST.